G. WAGNER.
DRIVING MECHANISM.
APPLICATION FILED JULY 15, 1909.

1,003,220.

Patented Sept. 12, 1911.

2 SHEETS—SHEET 1.

Witnesses:
James R. Mansfield
L. E. Witham.

Inventor:
Gustav Wagner.
By
Alexander Sowell
Attorneys

G. WAGNER.
DRIVING MECHANISM.
APPLICATION FILED JULY 15, 1909.

1,003,220.

Patented Sept. 12, 1911.
2 SHEETS—SHEET 2.

Witnesses:
James P. Mansfield
L. E. Witham

Inventor:
Gustav Wagner
By:
Alexander Towell
Attorney

UNITED STATES PATENT OFFICE.

GUSTAV WAGNER, OF REUTLINGEN, GERMANY.

DRIVING MECHANISM.

1,003,220.  Specification of Letters Patent.  Patented Sept. 12, 1911.

Application filed July 15, 1909. Serial No. 507,758.

*To all whom it may concern:*

Be it known that I, GUSTAV WAGNER, a subject of the King of Wurttemberg, and resident of Reutlingen, Germany, have invented certain new and useful Improvements in Driving Mechanisms, of which the following is a specification.

This invention relates to means for operating circular saws, and its object is to provide a novel worm-gearing for actuating the saw, and consists in arranging the worm-wheels, which transmit the revolutions of the driving-shaft to the spindle of the saw, on opposite sides of right and left-handed worms on the driving shaft, so that the reaction or thrust of the worm-gearing is neutralized and both gears transmit full power to the saw spindle through suitably arranged intermediate gears.

The drawings show two constructions embodying the invention.

Figure 1:
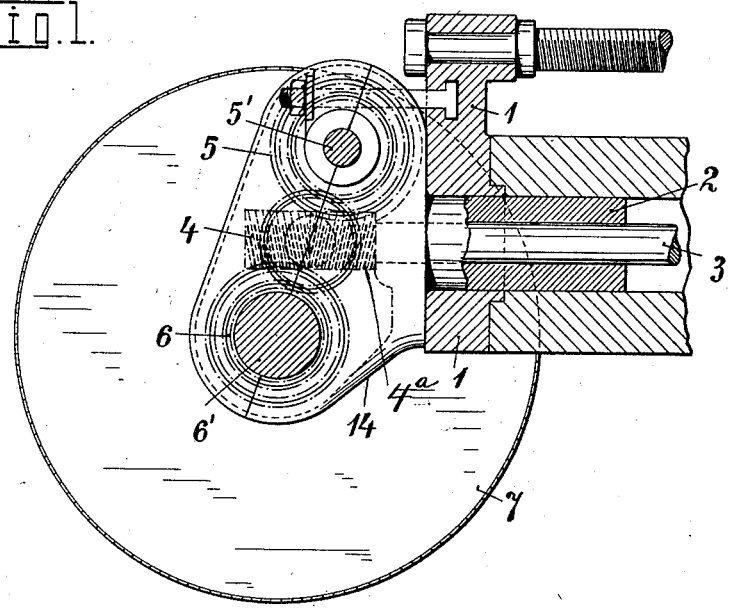
Figure 2:
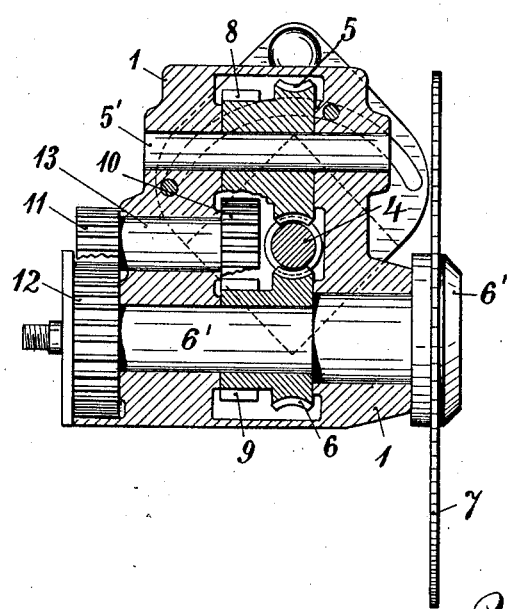
Figure 3:
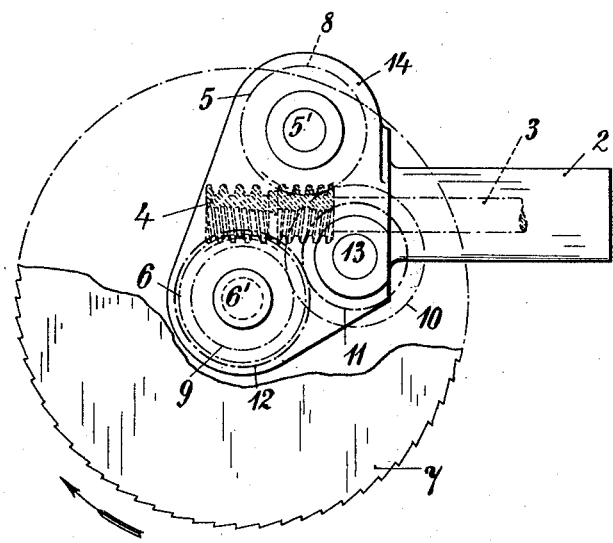
Figure 4:
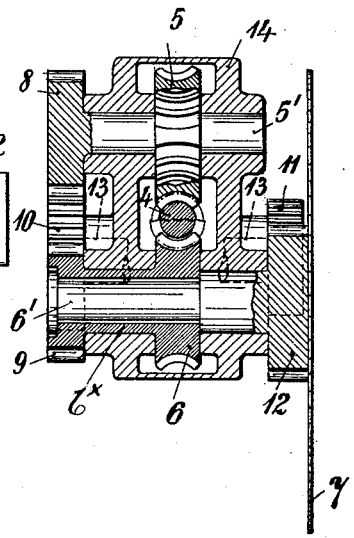
Figure 5:
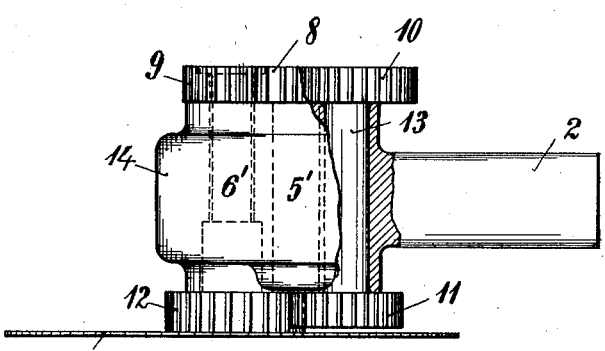

Figure 1 is a front elevation of a worm-gear drive, partly in section. Fig. 2 is a vertical cross-section of Fig. 1. Fig. 3 is a front elevation of a modified construction. Fig. 4 is a vertical cross section of Fig. 3; and Fig. 5 is a top view of Fig. 3 partly broken away.

Similar numerals refer to similar parts throughout the several views.

In the form of construction shown in Figs. 1 and 2, the saw 7 and its driving gearing are mounted upon the head 14 of a slidable ram or carrier which may be of any suitable construction; and the head has a shank 2 by which it is supported on the ram, and can be rotatably adjusted to set the saw at any desired angle.

The driving-shaft 3 enters the ram-head 14 and has on its end within the head two worms 4, 4ᵃ respectively right and left-handed. One worm 4ᵃ engages with a worm-wheel 5 upon a counter shaft 5′ transfixing the head, and the other worm 4 engages a worm-wheel 6 loosely mounted on the arbor 6′ of the saw. On the hubs of the worm-wheels 5 and 6 are fixed gears 8, 9, both engaging an intermediate gear 10, which is driven by both worm-wheels 8, 9 in one direction. The rotation of gear 10 is transmitted through shaft 13 to a gear 11 which meshes with a gear 12 keyed to the arbor 6 of the saw 7. By this arrangement of gearing the pressure on the gear-teeth is reduced by half, and the end thrust of the worms on shaft 3 is neutralized, and it is possible to rotatably adjust the head 14 on the ram in any desired position.

In the form of construction shown in Figs. 3 to 5, the worm-wheel 6 is fixed on a sleeve 6ˣ loosely mounted on the arbor 6′ of the saw, and on the outer end of the sleeve is keyed a gear 9.

The worm-wheel 5 is made with a finer pitch than the wheel 6, and is keyed on a shaft 5′ which has a gear 8 on its outer end. The gears 8 and 9 mesh with a gear 10 on a shaft 13 (Fig. 5) journaled in the head; and on shaft 13 is a gear 11 which meshes with a gear 12 fixed on the saw arbor. In this construction the worms 4, 4ᵃ, and their worm-wheels 5 and 6 are of different pitches, but so proportioned that the gears 9, 8, receive the same angular velocities. The gears 8 and 9 transmit motion through the intermediate gears 10 and gear 11 to the gear 12 on the arbor 6′. This arrangement of the gearing gives an increased transmission of power to the saw arbor without increasing the pressure on the worm-wheels. The diameter of the worm-wheels and of the saw arbor gear 12 can also be considerably reduced, and increase the power transmitted to the saw.

By using worm wheels of different pitches I am able to arrange the shaft 13 below the rear worm.

Having described my invention what I claim as new and desire to secure by Letters Patent thereon is:

1. The combination of a carrier, a drive shaft having oppositely-pitched adjacent worms, an arbor on the carrier disposed transversely to the said shaft, a worm-gear loosely mounted on said arbor and engaging one of the worms, a counter-shaft arranged transversely of the drive shaft at the side opposite the arbor, a worm on said counter-shaft meshing with the other worm on the drive shaft, and gearing for transmitting motion from each and both of the worms to the arbor, to drive the latter in one direction.

2. In a metal sawing machine, the combination of a carrier head, a drive-shaft extending axially into said head and provided with adjacent oppositely pitched worms, an arbor journaled in said head, a worm-gear mounted on said head and meshing with one of the worms on the drive shaft, a second worm-gear mounted on the head at the opposite side of the drive-shaft and meshing with the other worm, gears operatively connected with each worm, an intermediate gear meshing with both of said gears, and gearing between said intermediate gear and the arbor, whereby the power of each and both worms is transmitted to the arbor.

3. In a metal sawing machine, the combination of a carrier-head, a drive-shaft extending axially into said head and provided with adjacent oppositely pitched worms, an arbor journaled in said head transversely of the drive shaft, a counter-shaft journaled in said head parallel with the arbor but at the opposite side of the drive-shaft, a worm gear loose on said arbor meshing with one of the worms on the drive-shaft, a worm-gear on the counter-shaft meshing with the other worm, gears operatively connected with each worm, an intermediate gear meshing with both of said gears, and gearing between said intermediate gear and the arbor whereby the power of both worms is transmitted to the arbor.

4. In a sawing machine, the combination of a carrier, a head rotatably adjustable on the carrier, a driving shaft extending axially into said head and provided with adjacent oppositely threaded worms, an arbor mounted in said head transverse to the driving shaft, a counter-shaft mounted on said head parallel with the arbor but at the opposite side of the driving shaft, a worm-gear on said arbor meshing with one of the worms, a worm-gear on the counter-shaft meshing with the other of the worms, gears fast to said worm-gears, a stub-shaft journaled in the head, a gear on said stub-shaft meshing with the gears on both worms, and gearing between said stub-shaft and the arbor to drive the latter.

In testimony whereof I have signed my name to this specification in the presence of two subscribing witnesses.

GUSTAV WAGNER.

Witnesses:
HENRY HASPER,
WOLDEMAR HAUPT.

---

Copies of this patent may be obtained for five cents each, by addressing the "Commissioner of Patents, Washington, D. C."